United States Patent
Gomez

(10) Patent No.: US 11,886,630 B2
(45) Date of Patent: Jan. 30, 2024

(54) THREE-DIMENSIONAL VIRTUAL REALITY VEST

(71) Applicant: James Gomez, Santa Ana, CA (US)

(72) Inventor: James Gomez, Santa Ana, CA (US)

(*) Notice: Subject to any disclaimer, the term of this patent is extended or adjusted under 35 U.S.C. 154(b) by 46 days.

(21) Appl. No.: 17/673,784

(22) Filed: Feb. 17, 2022

(65) Prior Publication Data

US 2023/0259195 A1 Aug. 17, 2023

(51) Int. Cl.
| | | |
|---|---|---|
| *G06F 3/01* | (2006.01) | |
| *H04R 5/02* | (2006.01) | |
| *H04R 1/08* | (2006.01) | |
| *H04R 1/02* | (2006.01) | |
| *A41D 1/04* | (2006.01) | |
| *H02J 7/00* | (2006.01) | |

(52) U.S. Cl.
CPC ............. *G06F 3/011* (2013.01); *A41D 1/04* (2013.01); *G06F 3/016* (2013.01); *H04R 1/028* (2013.01); *H04R 1/08* (2013.01); *H04R 5/02* (2013.01); *H02J 7/0042* (2013.01); *H02J 7/0048* (2020.01); *H04R 2201/023* (2013.01); *H04R 2420/05* (2013.01); *H04R 2420/09* (2013.01)

(58) Field of Classification Search
CPC ........... G06F 3/011; G06F 3/016; A41D 1/04; H04R 1/08; H04R 5/02; H04R 2201/023; H04R 2420/05; H04R 2420/09; H02J 7/0042; H02J 7/0048
See application file for complete search history.

(56) References Cited

U.S. PATENT DOCUMENTS

| | | | | |
|---|---|---|---|---|
| 7,023,338 B1* | 4/2006 | Foth | ................... | H04B 1/385 |
| | | | | 441/89 |
| 2006/0143775 A1* | 7/2006 | Kim | ................... | A41D 1/005 |
| | | | | 2/102 |
| 2008/0153590 A1* | 6/2008 | Ombrellaro | ........... | F41H 1/02 |
| | | | | 463/30 |

(Continued)

FOREIGN PATENT DOCUMENTS

| | | | | | |
|---|---|---|---|---|---|
| CN | 102104639 | A | * | 6/2011 | |
| CN | 110786584 | A | * | 2/2020 | ............. A42B 3/285 |

(Continued)

OTHER PUBLICATIONS

Lindeman, R., Page, R., Yanagida, Y., Sibert, J., Towards Full-Body Haptic Feedback: The Design and Deployment of a Spatialized Vibrotactile Feedback System, Jan. 2004, Proc. of ACM Virtual Reality Software and Technology (VRST) 2004, pp. 146-149. (Year: 2004).*

(Continued)

*Primary Examiner* — Kirk W Hermann
(74) *Attorney, Agent, or Firm* — Jacob M. Ward; Ward Law Office LLC

(57) ABSTRACT

A three-dimensional virtual reality vest; the three-dimensional virtual reality vest may be beneficial for use by a user to enhance virtual reality, video game, movie, or other media experiences. The three-dimensional virtual reality vest includes a vest garment having a surround sound speaker system, a series of embedded haptic feedback devices, and additional features configured to provide an immersive three-dimensional user-experience for a user when worn.

1 Claim, 6 Drawing Sheets

(56) References Cited

U.S. PATENT DOCUMENTS

| | | | | |
|---|---|---|---|---|
| 2013/0010068 A1* | 1/2013 | Tiernan | ............... | G06V 30/142 |
| | | | | 348/46 |
| 2013/0033610 A1* | 2/2013 | Osborn | ................. | H04N 5/907 |
| | | | | 348/207.1 |
| 2013/0065692 A1* | 3/2013 | Aronzon | ............... | A63F 13/216 |
| | | | | 463/43 |
| 2016/0008206 A1* | 1/2016 | Devanaboyina | ....... | A61H 23/02 |
| | | | | 601/136 |
| 2017/0108892 A1* | 4/2017 | Lenzi | .................... | A41D 1/002 |
| 2017/0372525 A1* | 12/2017 | Rosenthal | .......... | H04N 21/4784 |
| 2018/0144607 A1* | 5/2018 | Abbott | .................. | A45C 15/02 |
| 2019/0037934 A1* | 2/2019 | Swank | .................. | G08B 5/004 |

FOREIGN PATENT DOCUMENTS

| | | | | |
|---|---|---|---|---|
| EP | 0951846 A2 * | 10/1999 | ............ | A42B 3/285 |
| JP | 7071823 B2 * | 5/2022 | | |

OTHER PUBLICATIONS

EksoVest Operator Manual, Feb. 2018, https://eksobionics.com/wp-content/uploads/2020/08/106892_EksoVest_Operator_Manual.pdf, p. 11-12, 25, 27 (Year: 2018).*

* cited by examiner

THREE-DIMENSIONAL VIRTUAL REALITY VEST

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of garments of existing art and more specifically relates to virtual reality vests.

RELATED ART

Virtual reality (VR) systems typically simulate places in real or imaginary worlds and provide a user with a simulated experience of being in these locations. VR systems typically provide the user with an immersive experience for the human senses of sight and sound. A headset is typically employed to provide the immersive experience for human sight by providing the user a view of the real or imaginary world that tracks the user's head movements. The immersive experience for human sound is typically provided by headphones that provide sound that changes as the user navigates the world to mimic the changes that would be perceived by a human in the virtual world. The sensation of touch and feel is lacking to non-existent in current VR systems. This lessens the overall VR experience. A suitable solution is desired.

U.S. Pub. No. 2016/0317383 to Stanfield relates to wearable devices, systems, methods and architectures for sensory stimulation and manipulation and physiological data acquisition. The described wearable devices, systems, methods and architectures for sensory stimulation and manipulation and physiological data acquisition is a garment with prepositioned, definite sensory stimulating devices attached. These sensory stimulating devices include, but are not limited to, electrical stimulation, audio and physical stimulation such as localised force generation, compression, constriction, vibration, and surround sound. Predetermined and defined actuators allow the wearer to receive tissue, nerve and/or muscle stimulation and/or contraction so that the stimulation is precise as determined by its ability to conform to the scientific methodology of repeatability, reproducibility and reliability; this being due to consistency of actuator positioning in one or multiple locals on the human body. A personal surround sound can also be integrated to the garment to ensure the wearer is always in the optimal position relative the speakers. These actuators can be force generators within the garment for the wearer to feel impact or apparatus or electrodes included in the garment to locally constrict and increase pressure on the wearer.

SUMMARY OF THE INVENTION

In view of the foregoing disadvantages inherent in the known virtual reality vest art, the present disclosure provides a novel three-dimensional virtual reality vest. The general purpose of the present disclosure, which will be described subsequently in greater detail, is to provide an effective three-dimensional virtual reality vest.

A three-dimensional virtual reality vest is disclosed herein. The three-dimensional virtual reality vest includes a vest garment. The vest garment comprises a surround sound speaker system and a series of embedded haptic feedback devices configured to provide an immersive three-dimensional user-experience for a user when worn. The vest garment includes a central processing unit configured to receive input from a VR unit via an input connection means. The vest garment further includes the surround sound speaker system in communication with the central processing unit. The surround sound speaker system comprises a series of audio speakers positioned about the vest garment. The vest garment further includes a back support and a neck support. The neck support may or may not be telescoping to allow height adjustment. The series of embedded haptic feedback devices are embedded in strategic locations throughout the vest to provide the sensations of vibration, pulsating, poking and others. The series of embedded haptic feedback devices include at least one vibration pad and at least one fan. The vest garment further includes a rechargeable battery. The rechargeable battery is configured to supply power to the vest garment. A power cord is provided which is in communication with the rechargeable battery. Additionally, the vest garment includes a series of pockets strategically placed to allow ease of access to said pockets by a user-wearer of the vest garment. The three-dimensional virtual reality vest is provided to enhance virtual reality, video game, movie, or other media experiences.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a three-dimensional virtual reality vest, constructed and operative according to the teachings of the present disclosure.

The various embodiments of the present invention will hereinafter be described in conjunction with the appended drawings, wherein like designations denote like elements.

DETAILED DESCRIPTION

Figure 1:
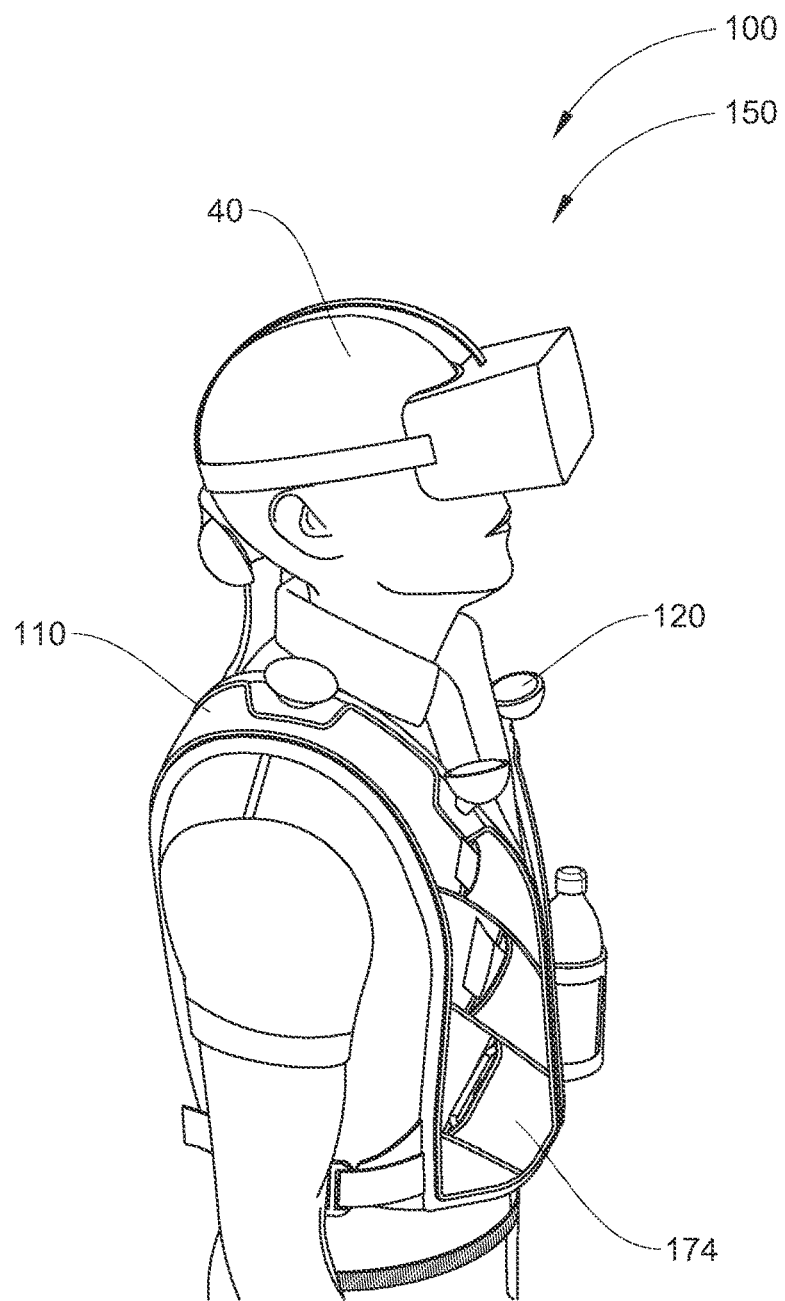
FIG. 1 is a perspective view of the three-dimensional virtual reality vest during an 'in-use' condition, according to an embodiment of the disclosure.

As discussed above, embodiments of the present disclosure relate to a virtual reality vest and more particularly to a three-dimensional virtual reality vest as used to improve virtual reality user experience.

Generally, the three-dimensional virtual reality vest provides improved audio, haptic technology, and comfort features to deliver a truly immersive virtual reality experience. The three-dimensional virtual reality vest is equipped with a surround sound speaker system and additional immersive features which provide an enhanced virtual reality, video game, movie, or other media experience. The surround sound speaker system includes strategically-positioned audio speakers providing surround sound to a user while using a virtual reality ("VR") device. By using the three-dimensional virtual reality vest instead of headphones or earphones, the wearer enjoys comfort and an audio depth that complements the visual effects of VR, thus enhancing a 3D experience.

Embedded haptic feedback devices are embedded in strategic locations throughout the vest garment to provide sensations of vibration, pulsating, poking and others. The embedded haptic feedback devices may include vibration machines, small fans with off centered blades, solenoids, etc. The vest garment further includes a plurality of compartments for storage of snacks, drinks, phones, and the like. The three-dimensional virtual reality vest may feature a various number of pockets of various sizes, and the pockets may be featured in various locations on the vest. The pockets may or may not include closing flaps, and various means of securement, such as but not limited to hook-and-loop material and buttons. Additionally, the vest garment may feature a neck support having a cushion pillow that is integrated into the vest garment for structural support. The cushion pillow provides a neck rest and/or a place to hang a headset. The vest garment includes a rechargeable battery and may be charged during use of the vest garment. An audible alert provides indication that the device is fully charged (other indications may be employed such as un-charged, partially charged etc.).

In one embodiment, the three-dimensional virtual reality vest is made of a woven nylon and polyester blend. Adjustable straps with buckles are featured on the sides. A pliable brace with a padded material extends from a top-center of a neck area of the vest garment. Contained in a closed compartment of the vest garment is a central processing unit (CPU). The CPU accepts input from a VR unit, and input connection means can be facilitated by the included three and half millimeter (3.5 mm) jack, and/or an included USB port, and/or Bluetooth® and/or Wi-Fi communication means. A rechargeable battery is also contained within this closed compartment and connects by wire to the other included elements. The vest garment includes multiple haptic feedback devices of different types such as embedded vibration pads and fans. A retractable power cord connects to, and is positioned below, the battery, and its external plug preferably extends from the vest garment. Featured about the vest garment are multiple audio speakers, and which connect by wire to the CPU. Additionally, a microphone is included and connected to the CPU, as well. Included on the vest garment are multiple pockets and at least one cup holder preferably produced from high-density polyethylene (HDPE).

The three-dimensional virtual reality vest may be made in various designs and sizes, and/or in a one-size-fits-most format. The three-dimensional virtual reality vest can be made of various materials of adequate durability, such as but not limited to nylon, polyester, rayon, cotton, vinyl, and any blend of these and other materials. The three-dimensional virtual reality vest may feature a various number of audio speakers of various sizes and capacities, and the audio speakers may be featured in various locations on the vest. The three-dimensional virtual reality vest may feature a various number of haptic devices of various sizes, types and capacities, and the haptic devices may be featured in various locations on the vest garment. The three-dimensional virtual reality vest may include a memory chip for storage of music and other audio files.

A user may simply wear the three-dimensional virtual reality vest upon their torso, and then plug a VR unit to its CPU by any accommodating method included in the device. The user may then enjoy the VR game or video of choice with superior audio accompaniment of simulated surround sound, and without having to wear headphones or earphones. The user may also enjoy this same simulated surround sound with regular, non-VR audio files. If the user needs to access an item during use, such as a beverage, snack, smartphone or other item, they may do so directly from the storage compartments of the vest garment without having to interrupt their VR experience. Should the rechargeable battery need recharging, the user may simply retract the power cord and apply it to an electrical socket. Additionally, the three-dimensional virtual reality vest may still be used while charging is in progress.

Referring now more specifically to the drawings by numerals of reference, there is shown in FIGS. 1-5, various views of a three-dimensional virtual reality vest 100.

FIG. 1 shows a three-dimensional virtual reality vest 100 during an 'in-use' condition 150, according to an embodiment of the present disclosure. Here, the three-dimensional virtual reality vest 100 may be beneficial for use by a user 40 to enhance virtual reality, video game, movie, or other media experiences. As illustrated, the three-dimensional virtual reality vest 100 may include a vest garment 110. The vest garment 110 includes a surround sound speaker system 120 and a series of embedded haptic feedback devices 130 configured to provide an immersive three-dimensional user-experience for a user 40 when worn and enhances a total experience of virtual reality videos and games.

Figure 2:
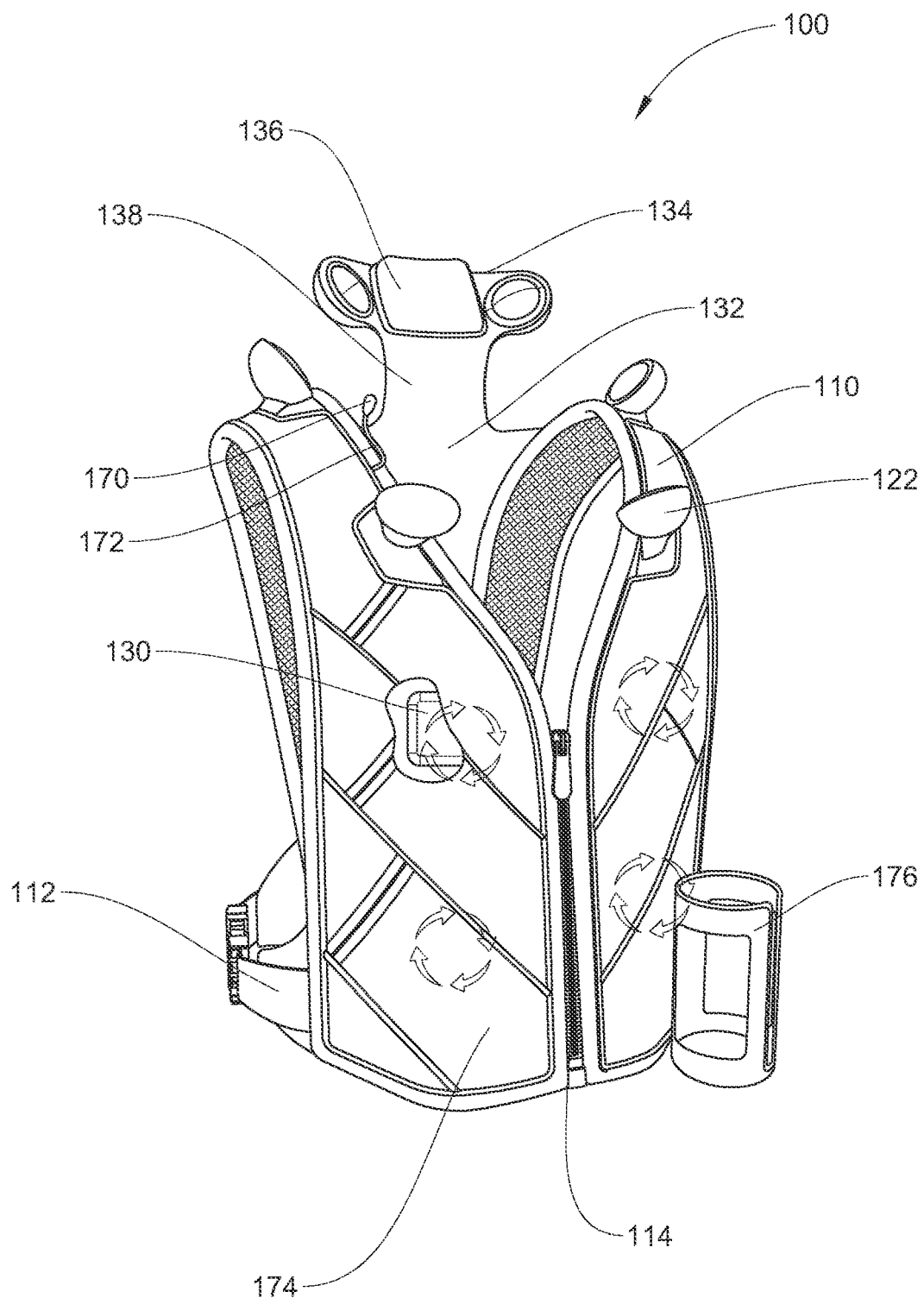
FIG. 2 is a front perspective view of the three-dimensional virtual reality vest of FIG. 1, according to an embodiment of the present disclosure.

FIG. 2 shows a front perspective view of the three-dimensional virtual reality vest 100 of FIG. 1, according to an embodiment of the present disclosure. As above, the three-dimensional virtual reality vest 100 may include vest garment 110 having a central processing unit 140 configured to receive input from a VR unit via input connection means 144. The vest garment 110 further includes the surround sound speaker system 120 in communication with the central processing unit 140. The surround sound speaker system 120 comprises a series of audio speakers 122 positioned about the vest garment 110 to provide immersive 3D sound. The three-dimensional virtual reality vest 100 effectively eliminates need for earphones and headphones for wear during VR videos and games.

As shown, the vest garment 110 includes the series of embedded haptic feedback devices 130, a back support 132, and a neck support 134. The series of embedded haptic feedback devices 130 are embedded in strategic locations throughout the vest to provide the sensations of vibration, pulsating, poking and others. The series of embedded haptic feedback devices 130 may include at least one vibration pad and/or at least one fan. Additional devices for providing haptic feedback may be included such as other vibration devices, fans with off centered blades, solenoids, liquid sprayers, scent sprayers, and/or other suitable devices. A rechargeable battery 160 is included. The rechargeable battery 160 is configured to supply power to the vest garment 110. A power cord 162 is provided which is in communication with the rechargeable battery 160. The power cord 162 for recharging of the rechargeable battery 160 of the three-dimensional virtual reality vest 100 may be of various lengths. The power cord 162 may also be separate from, and not for storage in, the vest garment 110.

As shown, the vest garment 110 comprises a microphone 170. The microphone 170 is in communication with the central processing unit 140. In a preferred embodiment, the microphone 170 includes a telescopic shaft 172. The microphone 170 is strategically placed to exclude background audio, and only receive audio from a user's voice when playing a multiplayer game. The neck support 134 of the vest garment 110 preferably includes a cushioned head rest 136 provided to enhance user comfort during wear. The neck support 134 may include two of the series of audio speakers 122 positioned on opposing sides of the cushioned head rest 136. In certain embodiment, the three-dimensional virtual reality vest 100 may not feature a cushioned head rest 136 on the neck support 134.

Figure 3:
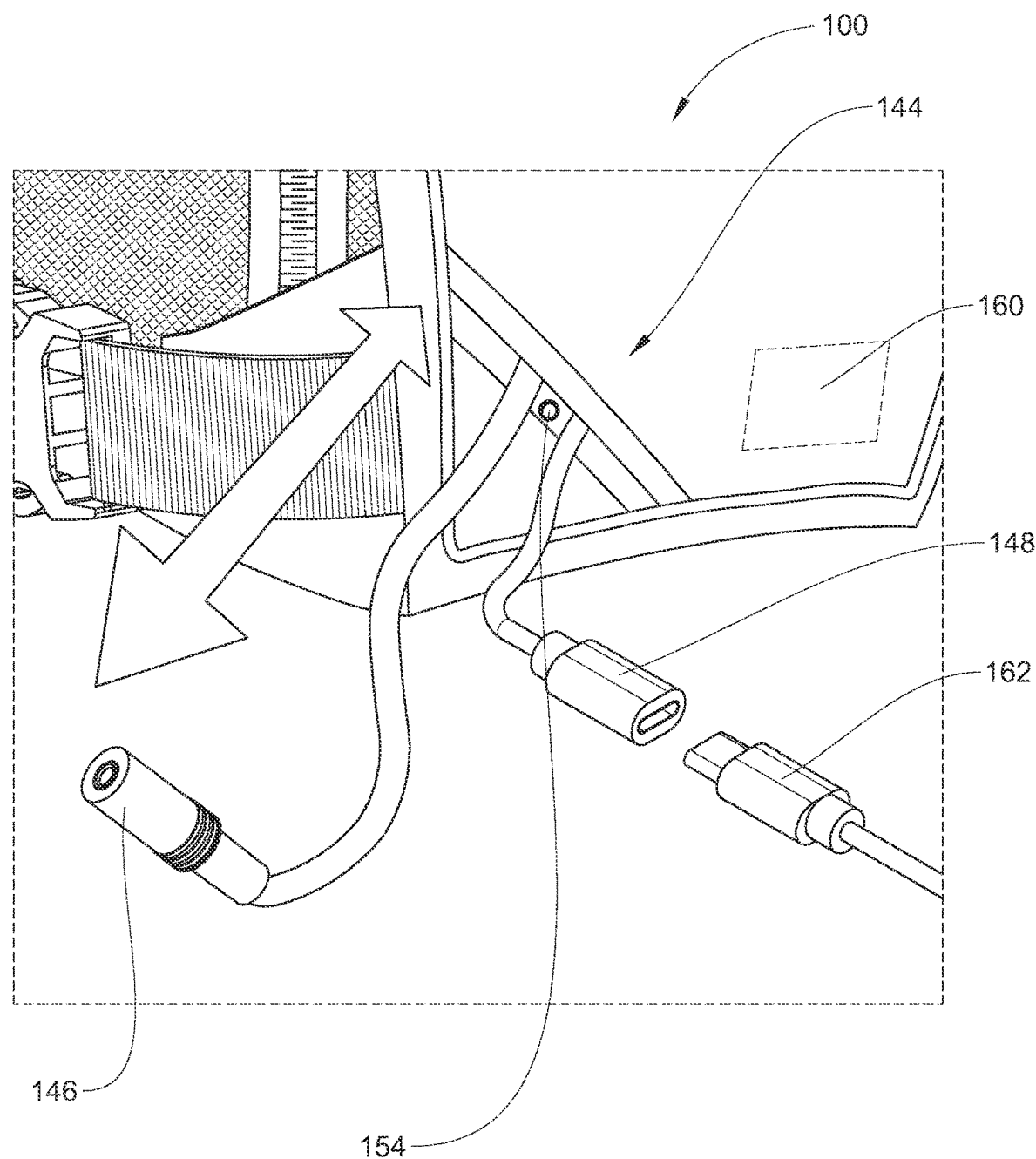
FIG. 3 is a perspective view of the three-dimensional virtual reality vest of FIG. 1, according to an embodiment of the present disclosure.

FIG. 3 is a perspective view of three-dimensional virtual reality vest 100 of FIG. 1, according to an embodiment of the present disclosure. As illustrated, vest garment 110 features input connection means 144 and the power cord 162 in communication with the rechargeable battery 160. In a preferred embodiment, the power cord 162 is retractable. The vest garment 110 may include various input connection means 144 for connection to a virtual reality unit. The input connection means 144 may include a 3.5 mm input jack 146 and/or a USB connection port 148, and/or a wireless internet connection. Additionally, the vest garment 110 may be configured to use short-range wireless communication and includes a receiver for BLUETOOTH® connectability. The vest garment 110 further includes a battery charge/status indication light 154.

Figure 4:
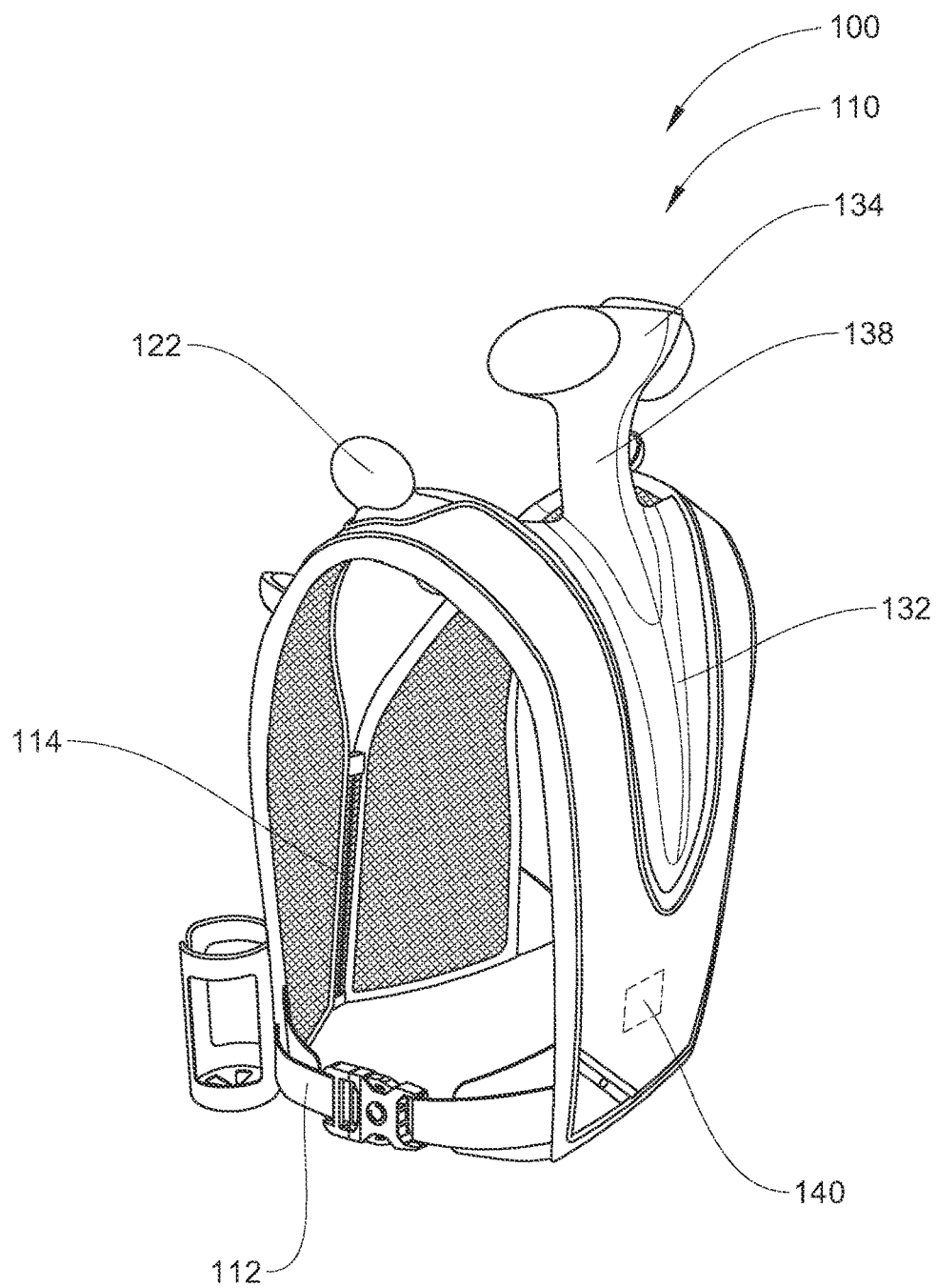
FIG. 4 is a perspective view of the three-dimensional virtual reality vest of FIG. 1, according to an embodiment of the present disclosure.

FIG. 4 is a perspective view of the three-dimensional virtual reality vest 100 of FIG. 1, according to an embodiment of the present disclosure. The three-dimensional virtual reality vest 100 includes the vest garment 110 for a user 40 to wear while participating in virtual reality games and experiences. The three-dimensional virtual reality vest 100 adds audio and haptic features to the video sensation of VR videos and games. The vest garment 110 further includes adjustable side straps 112 and a front fastener 114. As shown in the FIGS., the neck support 134 and back support 132 of the vest garment 110 are connected by a pliable brace 138. In certain embodiments, the neck support 134 may be height adjustable. In this embodiment, the pliable brace 138 may be telescopic. The vest garment may be configured to connect with additional vest garments 110 to functionally enable a group interactive experience such as watching movies, playing games, or listening to music together.

Figure 5:
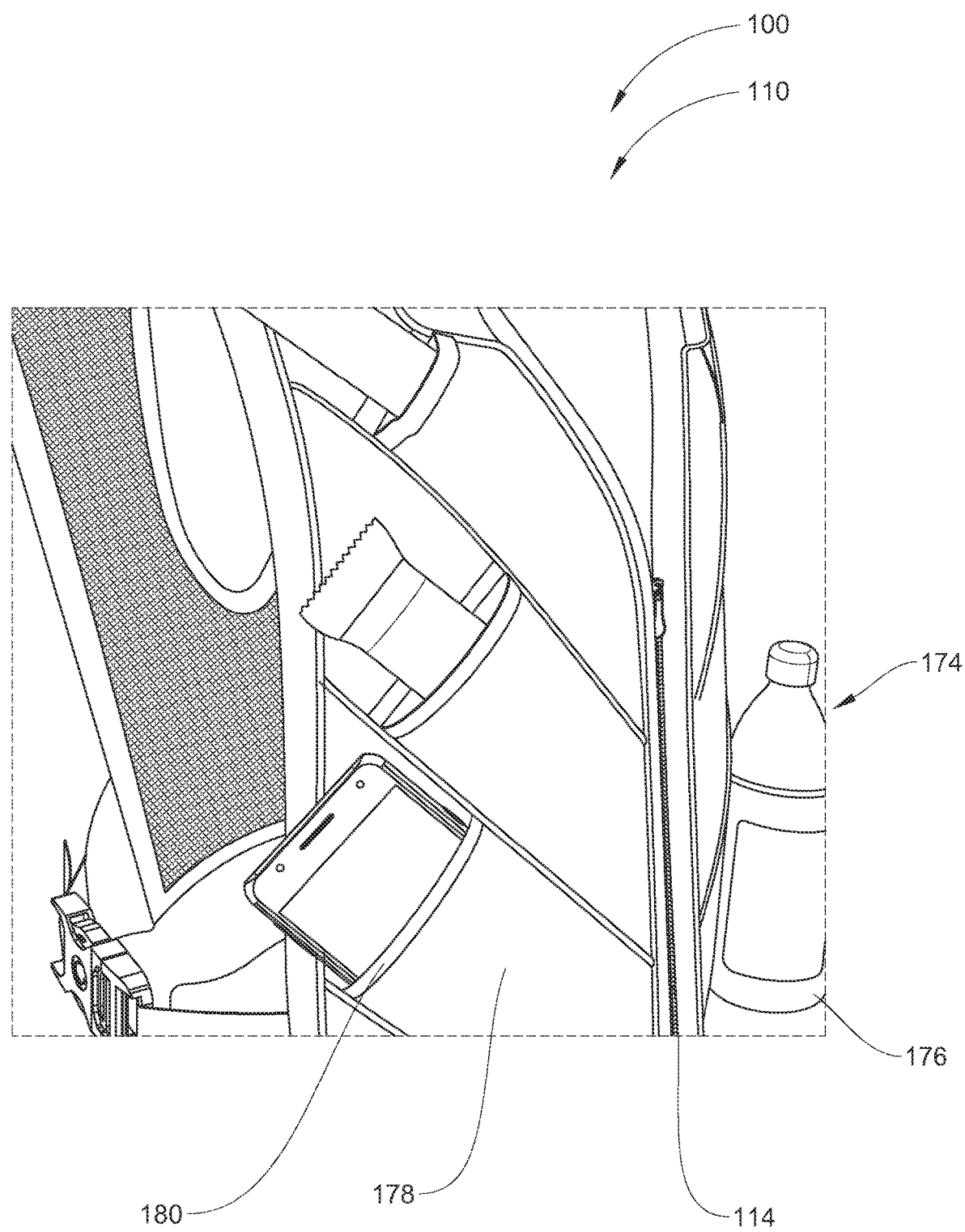
FIG. 5 is a perspective view of the three-dimensional virtual reality vest of FIG. 1, according to an embodiment of the present disclosure.

FIG. 5 is a perspective view of the three-dimensional virtual reality vest 100 of FIG. 1, according to an embodiment of the present disclosure. The vest garment 110 includes a plurality of storage compartments 174 for storage of at least one item. The plurality of storage compartments 174 are provided for keeping items directly on hand, and allowing users 40 to conveniently access those items without having to remove their headsets. The plurality of storage compartments 174 includes a beverage holder 176 configured to store a beverage container in a user-accessible location. The plurality of storage compartments 174 further includes at least one pocket 178 with an inner volume for storage of additional items including cellphones, snacks, and other items. In a preferred embodiment, the at least one pocket 178 includes an elasticized hem 180. The plurality of storage compartments 174 may comprise magnetic fasteners or elasticized hems to provide ease of access to items stored within the compartments.

Figure 6:
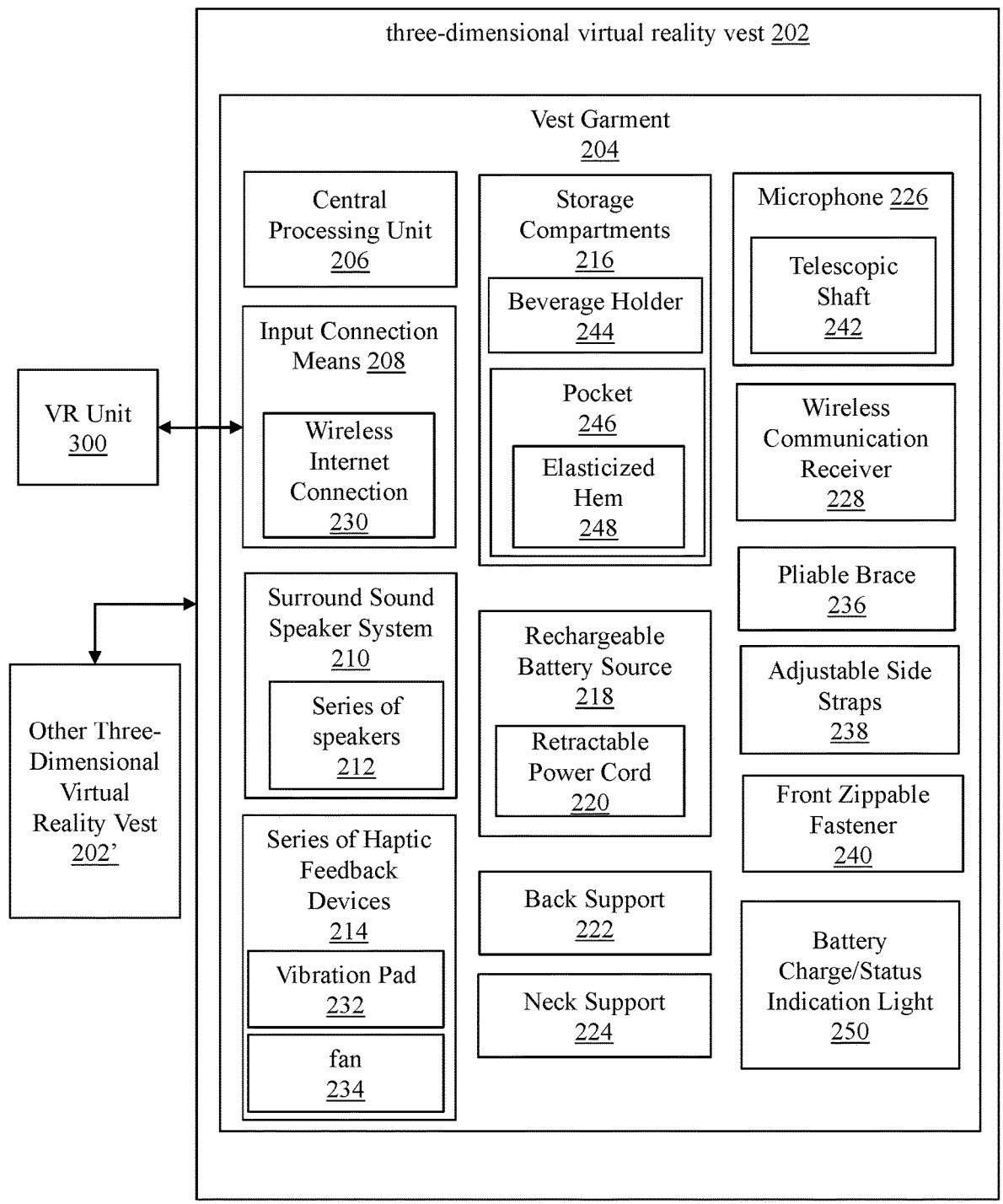
FIG. 6 is a block diagram illustrating a three-dimensional virtual reality vest, according to an embodiment of the present disclosure.

FIG. 6 is a block diagram illustrating a three-dimensional virtual reality vest 202, according to an embodiment of the present disclosure. The three-dimensional virtual reality vest 202 can include a vest garment 204 providing an immersive three-dimensional user-experience. The vest garment 204 can include a central processing unit 206 configured to receive input from a VR unit 300 via an input connection means 208. The vest garment 204 can also include a surround sound speaker system 210 in communication with said central processing unit 206 and include a series of audio speakers 212 positioned about said vest garment 204. Furthermore, the vest garment 204 can also include a series of embedded haptic feedback devices 214, a plurality of storage compartments 216 for storage of at least one item, a rechargeable battery source 218 configured to supply power to said vest garment 204, a power cord 220 in communication with said rechargeable battery source 218, wherein the power cord 220 is retractable. Additionally, the vest garment 204 can also include a back support 222 and a neck support 224, wherein the neck support 224 can be a cushioned head rest and include two of said series of audio speakers 212 positioned on opposing sides of said cushioned head rest. A microphone 226 can be provided, the microphone 226 embedded within the vest garment 204 and in communication with said central processing unit 206, wherein the microphone 226 is placed to exclude background audio, and to receive audio from a user's voice. The vest garment 204 is configured to use short-range wireless communication and includes a receiver 228. The input connection means 208 can include a wireless internet connection 230. The series of embedded haptic feedback devices 214 can include includes at least one vibration pad 232 and at least one at least one fan 234. The neck support 224 and back support 222 can be connected by a pliable brace 236. The vest garment 204 can also include adjustable side straps 238 and a front zippable fastener 240. The microphone can include a telescopic shaft 242. The vest garment 202 is configured to connect with additional said vest garments 202' to functionally enable a group interactive experience. The plurality of storage compartments 216 includes a beverage holder 244 and at least one pocket 246 with an inner volume and an elasticized hem 248. The vest garment 204 can also further include a battery charge/status indication light 250.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or

What is claimed is new and desired to be protected by Letters Patent is set forth in the appended claims:

1. A three-dimensional virtual reality vest, the three-dimensional virtual reality vest comprising:
   a vest garment providing an immersive three-dimensional user-experience, said vest garment having,
   a central processing unit configured to receive input from a VR unit via an input connection means,
   a surround sound speaker system in communication with said central processing unit and including a series of audio speakers positioned about said vest garment,
   a series of embedded haptic feedback devices,
   a plurality of storage compartments for storage of at least one item,
   a rechargeable battery source configured to supply power to said vest garment,
   a power cord in communication with said rechargeable battery source,
   a back support,
   a neck support, and
   a microphone embedded within the vest garment and in communication with said central processing unit, wherein the microphone is placed to exclude background audio, and to receive audio from a user's voice;
   wherein said vest garment is configured to use short-range wireless communication and includes a receiver;
   wherein said input connection means includes a wireless internet connection;
   wherein said power cord is retractable;
   wherein said series of embedded haptic feedback devices includes at least one vibration pad;
   wherein said series of embedded haptic feedback devices includes at least one fan;
   wherein said neck support comprises a cushioned head rest;
   wherein said neck support includes two of said series of audio speakers positioned on opposing sides of said cushioned head rest;
   wherein said neck support and back support are connected by a pliable brace;
   wherein said vest garment further includes adjustable side straps;
   wherein said vest garment further includes a front zippable fastener;
   wherein said microphone includes a telescopic shaft;
   wherein said vest garment is configured to connect with additional said vest garments to functionally enable a group interactive experience;
   wherein said plurality of storage compartments includes a beverage holder;
   wherein said plurality of storage compartments includes at least one pocket with an inner volume;
   wherein said at least one pocket includes an elasticized hem; and
   wherein said vest garment further includes a battery charge/status indication light.

* * * * *